US009239100B1

(12) United States Patent
Weber et al.

(10) Patent No.: US 9,239,100 B1
(45) Date of Patent: Jan. 19, 2016

(54) ROTARY SERIES ELASTIC ACTUATOR

(71) Applicant: Meka Robotics, LLC, San Francisco, CA (US)

(72) Inventors: Jeff Weber, San Francisco, CA (US); Aaron Edsinger, San Francisco, CA (US); Andy Metzger, San Francisco, CA (US)

(*) Notice: Subject to any disclaimer, the term of this patent is extended or adjusted under 35 U.S.C. 154(b) by 46 days.

(21) Appl. No.: 14/292,973

(22) Filed: Jun. 2, 2014

Related U.S. Application Data (60) Provisional application No. 61/838,625, filed on Jun. 24, 2013.

(51) Int. Cl.
| | | |
|---|---|---|
| *G01L 1/04* | (2006.01) | |
| *F16H 19/08* | (2006.01) | |
| *F16H 1/32* | (2006.01) | |
| *H02K 11/00* | (2006.01) | |

(52) U.S. Cl.
CPC ........ *F16H 19/08* (2013.01); *F16H 1/32* (2013.01); *F16H 2019/085* (2013.01); *H02K 11/00* (2013.01)

(58) Field of Classification Search
CPC ...... H02K 11/0042; H02K 7/116; F16H 1/32; F16H 1/46
USPC .................................. 73/862.45, 862.451
See application file for complete search history.

(56) References Cited

U.S. PATENT DOCUMENTS

| | | | | |
|---|---|---|---|---|
| 6,318,338 B1* | 11/2001 | Kawamura | ............. | F02D 11/10 123/399 |
| 8,102,134 B1* | 1/2012 | Theobald | ................ | B25J 5/005 318/568.11 |
| 8,435,309 B2* | 5/2013 | Gilbert | .................... | A61F 2/582 623/24 |
| 2003/0127635 A1* | 7/2003 | Morse | ...................... | B66D 3/18 254/268 |
| 2011/0067517 A1* | 3/2011 | Ihrke | ....................... | B25J 9/126 74/490.03 |
| 2011/0190934 A1* | 8/2011 | Reiland | .................. | G05B 15/00 700/258 |
| 2012/0286629 A1* | 11/2012 | Johnson | .................... | B25J 9/08 310/68 B |
| 2014/0067124 A1* | 3/2014 | Williamson | ......... | G05B 19/406 700/258 |

* cited by examiner

*Primary Examiner* — Max Noori
(74) *Attorney, Agent, or Firm* — McDonnell Boehnen Hulbert & Berghoff LLP (57) ABSTRACT

Example embodiments may relate to a series elastic actuator (SEA). The SEA may include a motor, a transmission assembly, and an output plate that collectively form a motor housing assembly. The motor housing assembly may be supported on bearings that allow for a rotation of the motor housing assembly. The bearings may be supported on a housing of the SEA that may be connected to a robot link. Springs may be connected between the housing and the transmission assembly. The springs may be connected such that friction is reduced between the balls and races of the bearings. A sensor may be configured to measure a rotary deflection of the transmission assembly. A string may be wrapped around a rotary shaft of the sensor and ends of the string may be attached to the transmission assembly such that a rotation of the transmission assembly causes a rotation of the rotary shaft.

20 Claims, 10 Drawing Sheets

ROTARY SERIES ELASTIC ACTUATOR

CROSS REFERENCE TO RELATED APPLICATION

The present application claims priority to U.S. Provisional patent application Ser. No. 61/838,625 filed on Jun. 24, 2013 and entitled "Rotary Series Elastic Actuator," the entire contents of which are herein incorporated by reference.

BACKGROUND

Unless otherwise indicated herein, the materials described in this section are not prior art to the claims in this application and are not admitted to be prior art by inclusion in this section.

Robotic systems may be used for applications involving material handling, welding, assembly, and dispensing, among others. Over time, the manner in which these robotic systems operate is becoming more intelligent, more efficient, and more intuitive. As robotic systems become increasingly prevalent in numerous aspects of modern life, the need for human safe robotic systems becomes apparent. Therefore, a demand in human safe robotics has helped open up a field of innovation in sensing techniques, actuators, as well as component design and assembly.

SUMMARY

Example embodiments may relate to a rotary series elastic actuator (SEA). The SEA may include a motor, a transmission assembly, and an output plate that collectively form a motor housing assembly. The motor housing assembly may be supported on rotary bearings that allow for a rotation of the motor housing assembly. The rotary bearings may be supported on a housing of the SEA that may be connected to a chassis (e.g., a robot link). One or more springs may be connected to a bottom plate of the housing on one end and to the transmission assembly on the other end of the springs. The springs may be connected such that a rotary deflection of the transmission assembly, during application of a load, causes a linear deflection of the springs. The springs may be machined springs configured for both compression and extension, thereby reducing friction between balls in the bearings and races of the bearings.

A sensor may be positioned on the housing and configured to measure the rotary deflection of the transmission assembly. Additionally, a measurement of the rotary deflection of the transmission assembly may be converted to a measurement of the linear deflection of the springs. Further, a string (e.g., a steel cable) may be wrapped around a rotary shaft of the sensor and ends of the string may be attached to the transmission assembly such that a rotation of the transmission assembly causes a rotation of the rotary shaft.

In one aspect, a system is provided. The system includes a transmission assembly rotatably connected to a motor, where the motor and the transmission assembly are supported on an inner race of one or more rotary bearings. The system also includes a housing connected to a chassis and configured to support an outer race of the one or more rotary bearings. The system additionally includes one or more springs each having a first end attached to a bottom plate of the housing and a second end connected to the transmission assembly such that friction is reduced between (i) balls in the one or more rotary bearings and (ii) the inner and outer races of the one or more rotary bearings. The system further includes a rotary sensor positioned on the housing and configured to measure a rotary deflection of the transmission assembly, where the rotary sensor comprises a rotary shaft. The system yet further includes a string wrapped around the rotary shaft, where ends of the string are attached to the transmission assembly such that a rotation of the transmission assembly causes a rotation of the rotary shaft.

In another aspect, a second system is provided. The system includes a transmission assembly rotatably connected to a motor, where the motor and the transmission assembly are supported on an inner race of one or more rotary bearings, and where the transmission assembly comprises an output plate connected to a first robot link. The system also includes a housing connected to a second robot link and configured to support an outer race of the one or more rotary bearings. The system additionally includes one or more springs each having a first end attached to a portion of the housing and a second end connected to the transmission assembly such that friction is reduced between (i) rolling elements in the one or more rotary bearings and (ii) the inner and outer races of the one or more rotary bearings. The system further includes a rotary sensor positioned on the housing and configured to measure a rotary deflection of the transmission assembly, where the rotary sensor comprises a rotary shaft. The system yet further includes a string wrapped around the rotary shaft, where ends of the string are attached to the transmission assembly such that a rotation of the transmission assembly causes a rotation of the rotary shaft.

In yet another aspect, a third system is provided. The system includes a transmission assembly rotatably connected to a motor, where the motor and the transmission assembly are supported on an inner race of one or more rotary bearings. The system also includes a housing connected to a chassis and configured to support an outer race of the one or more rotary bearings. The system additionally includes first and second springs each having a first end attached to a portion of the housing and a second end connected to the transmission assembly such that friction is reduced between (i) balls in the one or more rotary bearings and (ii) the inner and outer races of the one or more rotary bearings. The system further includes a rotary sensor positioned on the housing and configured to measure a rotary deflection of the transmission assembly, where the rotary sensor comprises a rotary shaft. The system yet further includes a string wrapped around the rotary shaft, where ends of the string are attached to the transmission assembly such that a rotation of the transmission assembly causes a rotation of the rotary shaft, where the rotation of the transmission assembly further causes an extension of the first spring and a compression of the second spring.

These as well as other aspects, advantages, and alternatives will become apparent to those of ordinary skill in the art by reading the following detailed description, with reference where appropriate to the accompanying drawings.

DETAILED DESCRIPTION

Example methods and systems are described herein. It should be understood that the words "example," "exemplary," and "illustrative" are used herein to mean "serving as an example, instance, or illustration." Any embodiment or feature described herein as being an "example," being "exemplary," or being "illustrative" is not necessarily to be construed as preferred or advantageous over other embodiments or features. The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

I. Overview

According to various embodiments, described herein are systems involving a rotary series elastic actuator (SEA). An actuator is a mechanism that may be used to introduce mechanical motion. In robotic systems, actuators may be configured to convert stored energy into movement of various parts of the robotic system. For example, in humanoid robots, actuators may be responsible for movement of robotic arms, legs, and head, among others.

Additionally, various mechanisms may be used to power an actuator. For instance, actuators may be powered by chemicals, compressed air, or electricity, among other possibilities. Further, in some cases, an actuator may be a rotary actuator that may be used in systems involving rotational forms of motion (e.g., a joint in a humanoid robot). However, in other cases, an actuator may be a linear actuator that may be used in systems involving straight line motion.

An example actuator includes a series elastic actuators (SEA) that may be used for human safe robotic applications due to gains in stability, force control, and protection against shock loads. In particular, as a robotic system interacts with an environment, gains in force control and stability may allow for a reduction in damages to the robotic system and/or the surroundings due to, for example, unexpected collisions.

More specifically, a series elastic actuator (SEA) may include an elastic element (e.g., a spring). The elastic element of the series elastic actuator (SEA) may be positioned such that a deflection of the elastic element may be proportional to the load. Such a configuration may allow for a force feedback mechanism when the deflection of the elastic element is measured with a sensor. Additionally, an elastic element may need a larger deformation to exert the same force as a stiffer element, thus allowing for gains in force control.

Rotary designs of series elastic actuators may be advantageous due to their potential for continuous output motion. The rotary SEA disclosed herein may include a motor, a transmission assembly, and an output plate that collectively form a motor housing assembly. The motor housing assembly may be supported on one or more rotary bearings that allow for a rotation of the motor housing assembly relative to ground (e.g., a chassis). The rotary bearings may be supported on a housing of the SEA that may be connected to a chassis (e.g., a robot link). One or more springs may be connected to a bottom plate of the housing on one end and to the transmission assembly on the other end of the springs. The springs may be connected such that a rotary deflection of the transmission assembly, during application of a load, causes a linear deflection of the springs. The springs may be machined springs configured for both compression and extension, thereby reducing friction between balls in the bearings and races of the bearings.

A rotary sensor (e.g., a Hall Effect encoder) may be positioned on the housing and configured to measure the rotary deflection of the transmission assembly. In particular, a string (e.g., a steel cable) may be wrapped around a rotary shaft of the sensor and ends of the string may be attached to the transmission assembly such that a rotation of the transmission assembly causes a rotation of the rotary shaft. This configuration may allow for a measurement of the rotary deflection of the transmission assembly. Additionally, a measurement of the rotary deflection of the transmission assembly may be converted to a measurement of the linear deflection of the springs.

II. Example Rotary Series Elastic Actuator (SEA)

Figure 1:
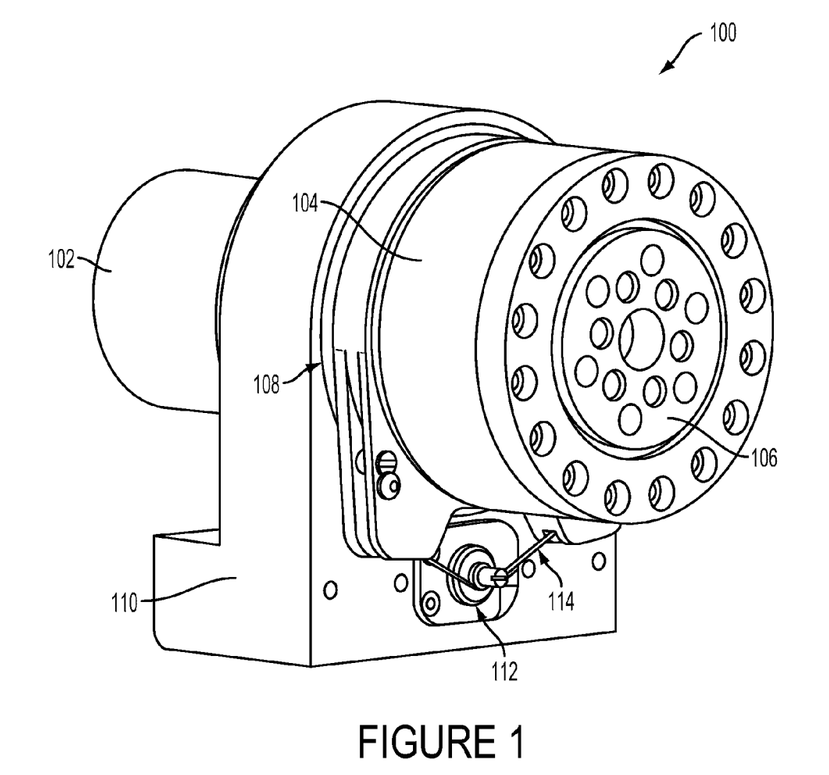
FIG. 1 illustrates an example configuration of a rotary series elastic actuator (SEA), according to an example embodiment.

Referring now to the figures, FIG. 1 shows an example configuration of a rotary series elastic actuator (SEA) 100. The rotary SEA 100 includes a motor 102, a transmission assembly 104, an output plate 106, rotary bearing(s) 108, a housing 110, a rotary sensor 112, and a string 114. Additional components and features of the rotary SEA 100 will be further discussed below in association with discussion of additional figures.

The motor 102 may be a brushed DC motor, a brushless DC motor, or an AC motor such as a synchronous electric motor or an induction motor, among other possibilities. In particular, the motor 102 may include a motor shaft, a stationary stator, and a rotor coupled to the motor shaft such that the motor shaft is configured to deliver mechanical power to the transmission assembly 104, thereby causing a rotation of the transmission assembly 104. Note that the motor shaft, the stationary stator, and the rotor are not shown in FIG. 1.

More specifically, the stator may be a stationary part of motor 102. For example, the stator may include an electromagnet and a coil including windings that can be composed of any conductive material. On the other hand, the rotor may be a non-stationary portion of the motor 102 and may include conductors that interact with a magnetic field produced by the windings in the stator. Such an interaction may result in the development of a torque that can cause a rotation of the rotor about an axis, thereby allowing the motor shaft to deliver mechanical power. Other components may also be included and additional motor configurations may also be possible.

The transmission assembly 104 may be configured to transmit mechanical power from the motor 102 to a load. Additionally, the transmission assembly 104 may include a casing, a gearbox, clutch, differential, drive shafts, and/or other elements. In particular, the transmission assembly 104 casing may be composed of any rigid material (e.g., aluminum or steel) and may be configured to surround the internal components of the transmission assembly 104 such that the internal components are protected. Further, the transmission assembly 104 may include a harmonic drive (may also be referred to as "strain wave gearing") that may be used for gear reduction, increaser gearing, and/or differential gearing. In particular, a harmonic drive may include a wave generator, a flex spline, and a circular spline.

The wave generator may include an elliptical disk with a thin ball bearing placed around the outer circumference of the elliptical disk. Additionally, the wave generator may be mounted on the motor shaft such that a rotation of the motor shaft results in a wave-like motion of the wave generator. The flex spline may be fitted over and elastically deflected by the wave generator. More specifically, the flex spline may be a cup shaped component that includes external teeth along an outer circumference of the cup. In one case, the flex spline may be configured as the output element (e.g., output plate 106) of the harmonic drive. In another case, the flex spline may be coupled to another element, such as a dynamic spline, configured as the output plate 106. Note that the dynamic spline may include interior teeth and may include the same number of teeth as the flex spline. The dynamic spline may be configured to rotate together with the flex spline. Other cases may also be possible.

On the other hand, the circular spline may be a stationary rigid circular ring that includes interior teeth configured to engage the external teeth of the flex spline. In particular, there may be more teeth (e.g., two more) on the circular spline than the flex spline. In operation, such a configuration may result in the flex spline rotating at a slower speed and in an opposite direction than the wave generator. Other configuration of the harmonic drive may also be possible.

The motor 102 and the transmission assembly 104 may be supported on an inner race of the rotary bearing(s) 108. The rotary bearing(s) 108 may be any type of a rolling-element bearing. A rolling-element bearing may include rolling elements such as rollers or balls, among other possibilities. The rolling elements may be placed between an inner and an outer race of the bearing. For example, a ball bearing may include a stationary outer race and a rotating inner race configured to cause balls in the bearing to rotate. The rotary bearing(s) 108 may be used to reduce the rotational friction caused by a rotation of the motor 102 and/or the transmission assembly 104. Additionally, the rotary bearing(s) 108 may allow for rotation of the motor 102 and transmission assembly 104 relative to ground. Any number of rotary bearing(s) 108 may be used to support the motor 102 and transmission assembly 104.

The rotary bearing(s) 108 may be supported on their outer race by a housing 110. The housing 110 may be connected (e.g., bolted) to a rigid chassis, robot link, or any other part of a robotic system. The housing 110 may be composed of any material and may be designed to take on any suitable shape. Additionally, the housing 110 may be configured to support the rotary sensor 112. As further shown in FIG. 1, the string 114 wraps around a shaft of the rotary sensor 112 and is attached at each end to the transmission assembly 104 such that a rotation of the transmission assembly 104 causes a rotation of the shaft of the rotary sensor 112. An additional discussion of the rotary sensor 112 and string 114 is presented below in association with FIG. 5.

Figure 2:
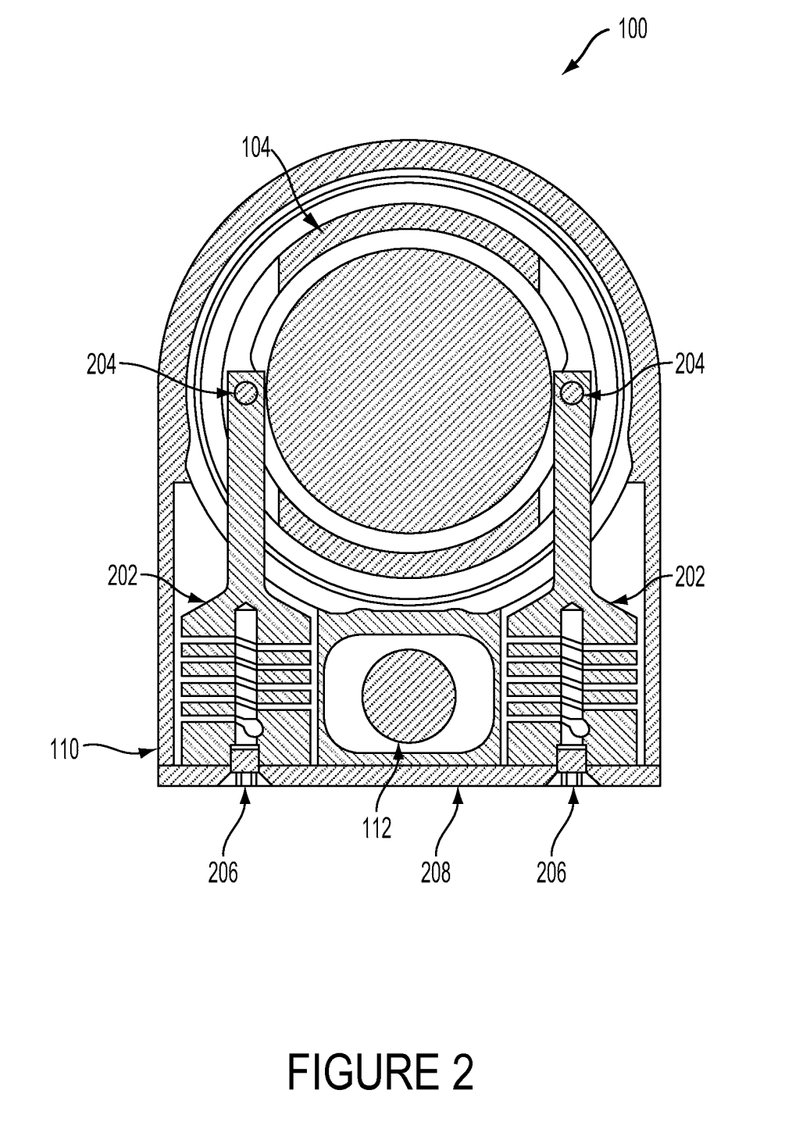
FIG. 2 illustrates a cross section view of the rotary SEA, according to an example embodiment.

FIG. 2 shows a cross section view of the rotary SEA 100. More specifically, FIG. 2 shows springs 202 connected between the transmission assembly 104 and a bottom plate 208 of the housing 110. While two springs are shown, any number of springs may be used. The springs 202 may be attached to the transmission assembly 104 using a pin attachment feature 204. For example, the springs 202 may be machined linear springs that include an arm extension on one end that is attached to the transmission assembly 104 with an inserted pin. Other mechanisms may also be used to attach the springs 202 to the transmission assembly 104.

Such a configuration may result in a rocker-arm mechanism, thereby converting a rotary deflection of the transmission assembly 104, during application of a load, to a linear deflection of the springs 202. As further discussed below, this configuration may allow the rotary sensor 112 to convert a measurement of the rotary deflection of the transmission assembly 104 to a measurement of the linear deflection of the spring 202. Note that the deflection of the spring 202 may be referred to as linear in the context of simplified calculations such as a small-angle approximation. However, the deflection of the spring 202 is not limited to a linear deflection (e.g., the incident angle on the spring may change slightly during compression).

Figure 3:
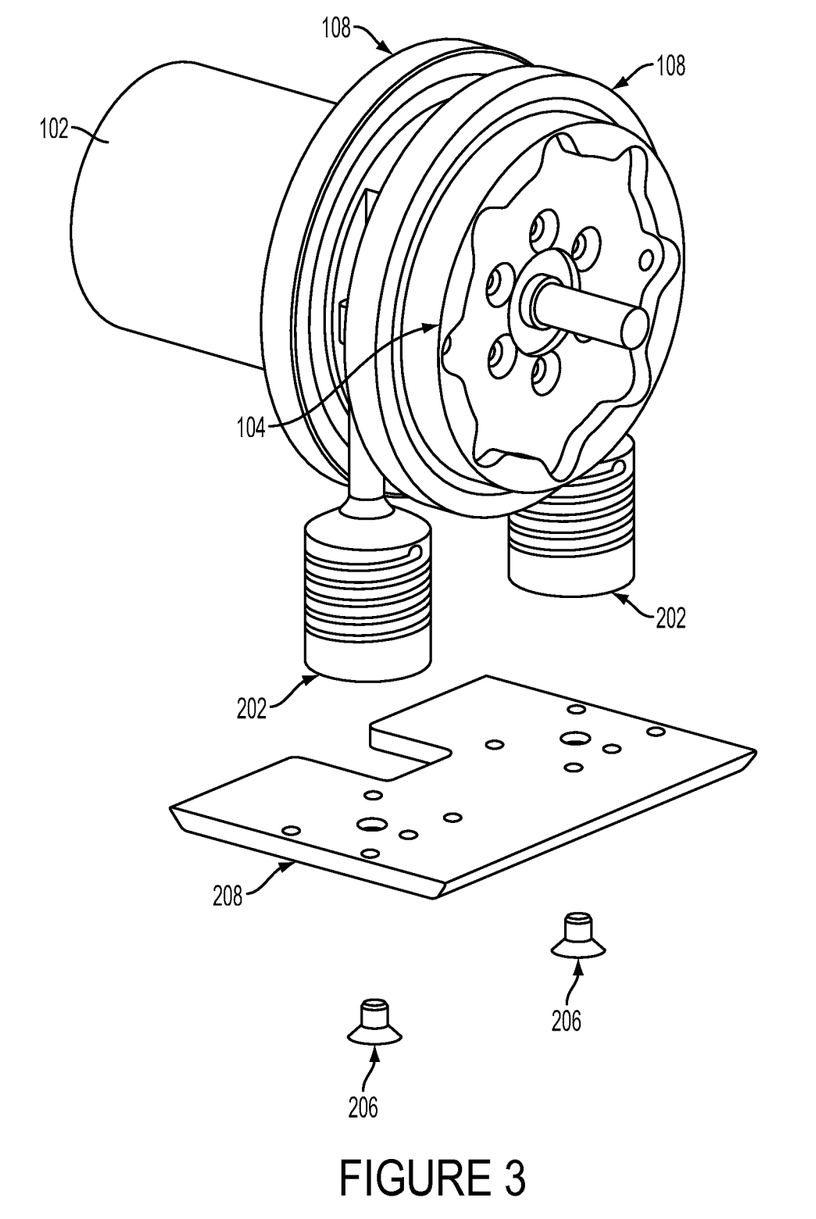
FIG. 3 illustrates an alternate view for several components of the rotary SEA, according to an example embodiment.

To further illustrate the configuration of springs 202, consider FIG. 3 showing an alternate view for several components of the rotary SEA 100. More specifically, FIG. 3 shows motor 102, internal components of the transmission assembly 104, rotary bearing(s) 108, and springs 202. Springs 202 may be attached to the bottom plate 208 of the housing 110 using screws 206. In particular, each screw 206 may be screwed into the bottom of a spring 202 as shown in FIG. 2. The bottom plate 208 may react against the springs 202 during compression and the screws 206 may react against the springs 202 during extension. Other configurations may also be possible.

As mentioned above, springs 202 may be machined springs. Machined springs may be configured for both compression and extension. In contrast, die springs may be purely compressive and as a result, such a spring assembly may need a preload of more than 50% of the working load such that the die springs are compressed during operation. A high preload may result in the rotary bearing(s) 108 experiencing a load even if no torque is applied to the transmission assembly 104.

Such a load may result in additional and undesirable friction (e.g., rolling resistance) between the rolling elements of the rotary bearing(s) 108 and the inner and outer races of the rotary bearing(s) 108. The additional friction may result in significant hysteresis in the measurements of the rotary sensor 112. Using machined springs may allow for a significant reduction (or elimination) of the preload due to the spring's configuration for use in both compression and extension. As a result, the additional friction may be reduced (or eliminated), thus reducing (or eliminating) significant hysteresis in the measurements of the rotary sensor 112. In other words, using machined springs configured for both compression and extension may improve the performance of rotary sensor 112. However, other spring configurations may also be used.

Figure 4:
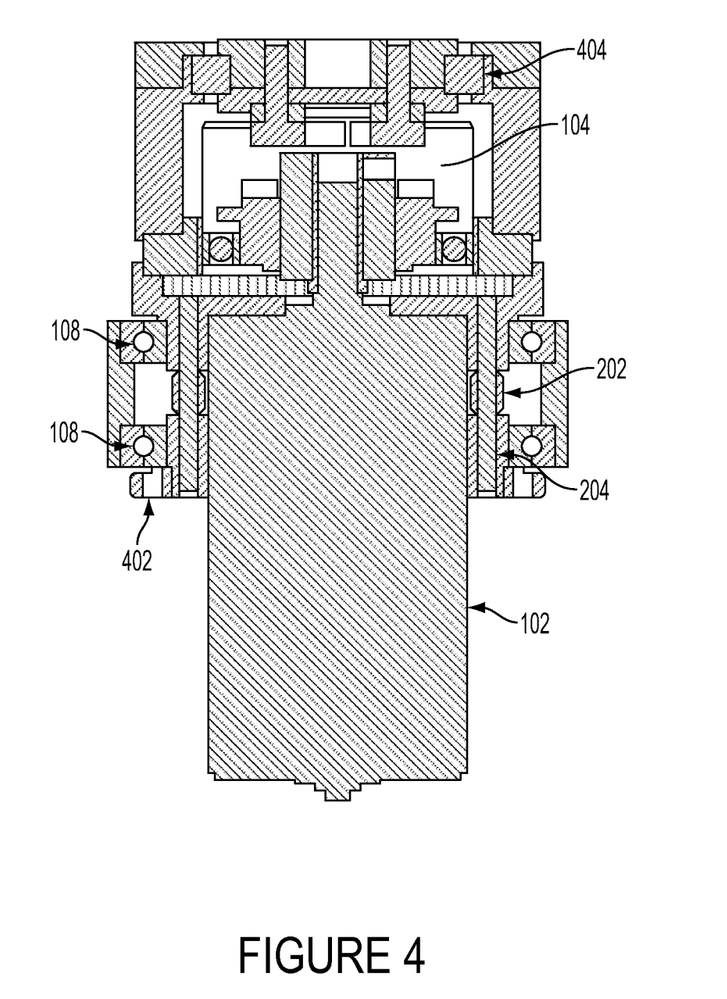
FIG. 4 illustrates a top section view of the rotary SEA, according to an example embodiment.

FIG. 4 shows a top section view of the rotary SEA 100. More specifically, FIG. 4 shows motor 102, internal components of the transmission assembly 104, two rotary bearings 108, springs 202, pin attachment feature 204, a bearing preload nut 402, and an integrated output bearing 404. FIG. 4 shows the motor 102 and transmission assembly 104 supported on a set of rotary bearing(s) 108. In one case, both the motor 102 and the transmission assembly 104 may be supported on the rotary bearing(s) 108. In another case, the motor 102 may be positioned on the rotary bearing(s) 108 and configured to support the transmission assembly 104 such that the transmission assembly 104 is not in contact with the rotary bearing(s) 108. Other cases may also be possible.

As discussed above, machined springs may be employed as springs 202 to reduce additional friction between the rolling elements of the rotary bearing(s) 108 and the inner and outer races of the rotary bearing(s) 108. However, it may be desirable to allow for some friction in the rotary bearing(s) 108 as long as the friction does not appear in the force sensing signal as stiction based hysteresis. As a result, the bearing preload nut 402 (may also be referred to as a tunable nut) may be configured such that, when turned, a preload is applied to the rotary bearing(s) 108, thereby allowing for an adjustment of the friction in the rotary bearing(s) 108 before a torque is applied.

Additionally, the nut 402 may be held in place with a retaining wire, a second nut, or a thread lock, among other possibilities. Further, one or more bearing preload nuts 402 may be used to adjust the friction. In one case, friction in each rotary bearing 108 may be adjusted using a different bearing preload nut 402. In another case, multiple bearing preload nuts 402 may be used to adjust friction in each rotary bearing 108. Other cases may also be possible and other configuration may also be used to adjust the friction between the rolling elements of the rotary bearing(s) 108 and the inner and outer races of the rotary bearing(s) 108.

Integrated output bearing 404 may be configured to support the load on the output side of the transmission assembly 104. More specifically, the integrated output bearing 404 may be configured to support the output plate 106 as shown in FIG. 1. In particular, the integrated output bearing 404 may allow for a differential rotation of the output plate 106 with respect to the casing of the transmission assembly 104. Additionally, the same type of bearing may be used for the integrated output bearing 404 as used for the rotary bearing(s) 108. Alternatively, a different type of bearing may be used for the integrated output bearing 404. Further, one or more integrated output bearings 404 may be used to support the output plate 106. Other configurations may also be possible.

Figure 5:
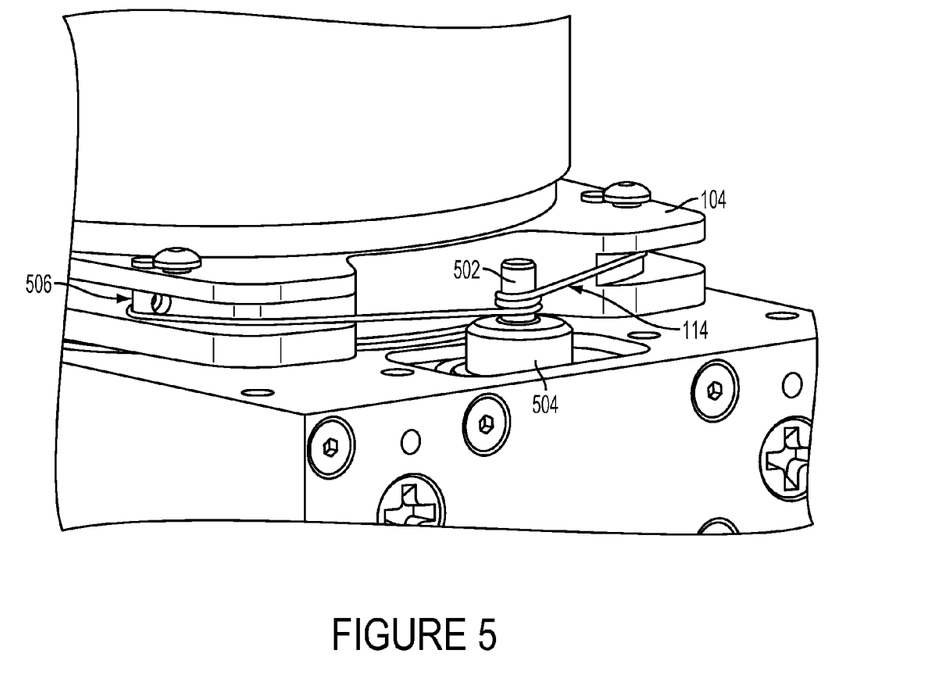
FIG. 5 illustrates a detailed view of a sensor positioned on the rotary SEA, according to an example embodiment.

FIG. 5 shows a detailed view of the rotary sensor 112. In particular, the rotary sensor 112 may be any type of a high resolution (e.g., 14-bit) rotary position sensor. For example, the rotary sensor 112 may be a Hall Effect encoder. The Hall Effect encoder may use any number of magnetic poles to represent a rotary position to a magnetic sensor. Other examples of rotary sensors may include an optical encoder, a capacitive encoder, a mechanical encoder, and a potentiometer, among others. Note that the rotary sensor may be an absolute encoder or an incremental encoder.

Additionally, the rotary sensor 112 may include a rotary shaft 502 and a fixed body 504. The fixed body 504 may be attached to the housing 110 and may include circuitry (e.g., a processor) configured to determine information regarding the position and motion of the rotary shaft 502. The information may then be sent to a controller and/or an on-board computer configured to adjust the operation of the robotic system and/or the rotary SEA 100 based on the information.

The rotary sensor 112 may be configured to measure the rotary deflection of the motor 102 and the transmission assembly 104. In particular, the rotary sensor 112 may be configured to convert the angular position and/or motion of the motor 102 and transmission assembly 104 to an analog or digital code such that the output of the rotary sensor 112 indicates the rotary deflection. Note that the rotary sensor 112 may also provide information about speed and distance, among other possibilities.

As mentioned above, the motor 102 and the transmission assembly 104 may be rigidly connected and may both be supported on the rotary bearing(s) 108. If a load is applied to the output plate 106, the motor 102 and the transmission assembly 104 may rotate on the rotary bearing(s) 108. For example, at full load (e.g., twenty five newton-meters of torque applied in one direction) the rotation may include a five degree angular deflection of the motor 102 and transmission assembly 104, thereby resulting in a ten degree sweep when accounting for the angular deflection in each direction of rotation.

The rotation of the motor 102 and the transmission assembly 104 may cause a linear deflection of the springs 202. For example, at full load, one of the two springs 202 may be at full compression while the other spring 202 may be at full extension. As a result, the rotary sensor 112 may be configured to measure the position of the springs 202, which may be proportional to the torque. In some cases, a linear deflection sensor may also be employed to measure the linear deflection of the springs 202 to provide additional sensitivity to the rotary SEA 100. Other cases may also be possible.

In an example embodiment, the rotary sensor 112 may be configured to provide amplification of the rotary deflection measurements. More specifically, the rotary sensor 112 may be a high resolution 14-bit encoder that may be configured, for example, to provide a full revolution of the shaft 502 at full load. However, note that the rotary sensor 112 may be configured to provide any form of amplification (e.g., two revolutions of the shaft 502 at full load).

As mentioned above, the rotation of the shaft 502 may be caused by the string 114 that may be wrapped around the shaft 502 of the rotary sensor 112 and may be attached at each end to the transmission assembly 104 such that a rotation of the transmission assembly 104 causes a rotation of the shaft 502 of the rotary sensor 112. More specifically, the string 114 may be a steel cable or any other type of flexible element (e.g., Vectra plastic or Spectra fiber). Additionally, the string 114 may wrap around the shaft 502 one or more times such that the string 114 provides sufficient friction with the shaft 502 to accurately measure the rotary deflection of the motor 102 and the transmission assembly 104.

The string 114 may be a tensioned string and may attach at each end to the transmission assembly 104. In particular, a winding mechanism 506 may be positioned on one end and configured to wind up the length of the string 114 and as a result, apply a static tension. The winding mechanism may include a rotating spindle and a locking screw. More specifically, a rotation of the spindle may cause an adjustment of the tension and the locking screw may be configured to maintain the adjustment of the tension. However, any similar mechanism may be used to wind up the length of the string 114. Additionally, in some cases, a second winding mechanism may also be positioned on the other end. The winding mechanism 506 and string 114 may allow for an efficient transmission of the rotary deflection to the rotary sensor 112 with negligible losses, thereby ensuring accurate sensor performance.

Figure 6A:
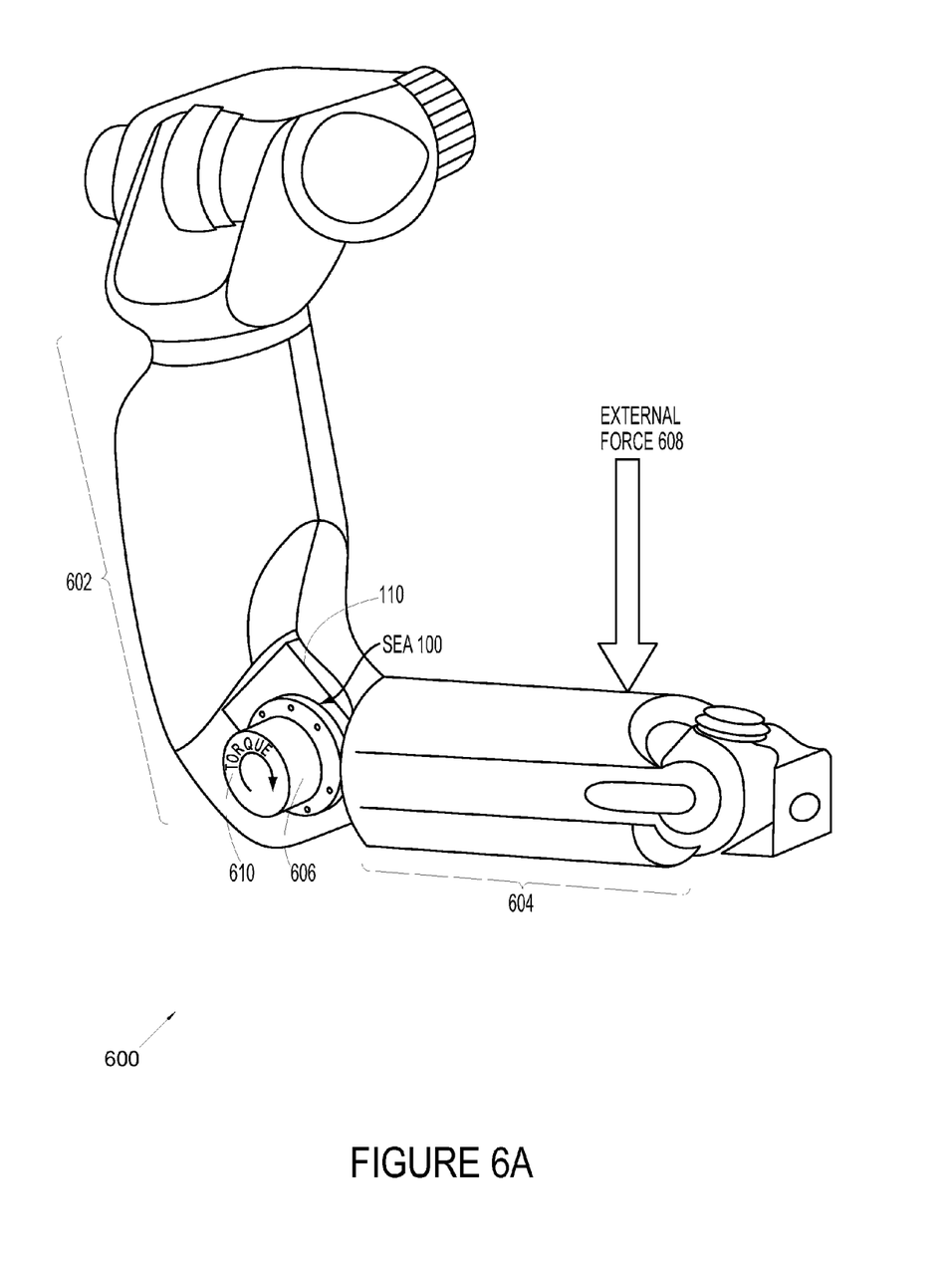
FIG. 6A illustrates an example implementation of the rotary SEA in a robotic arm, according to an example embodiment.

FIG. 6A shows an example implementation of the rotary SEA 100 in a robotic system. In particular, FIG. 6A shows a robotic arm 600 that includes robotic arm links 602 and 604. In an example implementation, the rotary SEA 100 may be positioned at a joint of the robotic arm 600 such that the robotic arm link 604 rotates about the joint. More specifically, the housing 110 of the rotary SEA 100 may be fixed to the robotic arm link 602 (i.e., ground). For example, the bottom plate 208 of the housing 110 may be attached to the robotic arm link 602 using screws. However, the housing 110 may be fixed to the robotic arm link 602 in any suitable manner. The robotic arm link 604 may be connected to the output plate 106 of the rotary SEA 100 to allow for rotation of the robotic arm link 604 about the joint. Various mechanisms, such as screws, may be used to connect the robotic arm link 604 to the output plate 106.

The motor 102, the transmission assembly 104, and the output plate 106 collectively form a motor housing assembly 606. As mentioned above, the motor 102 and the transmission assembly 104 may be rigidly connected and may be supported on an inner race of the rotary bearing(s) 108. As a result, the rotary bearing(s) 108 may allow for a rotation of the motor housing assembly 606 relative to ground. More specifically, the motor housing assembly 606 may rotate when an external force 608 is applied to the robotic arm link 604. The external force 608 may be applied to the robotic arm link 604 at any angle and at any location on the robotic arm link 604. Further, the external force 608 may cause an application of a torque 610 to the motor housing assembly 606.

Figure 6B:
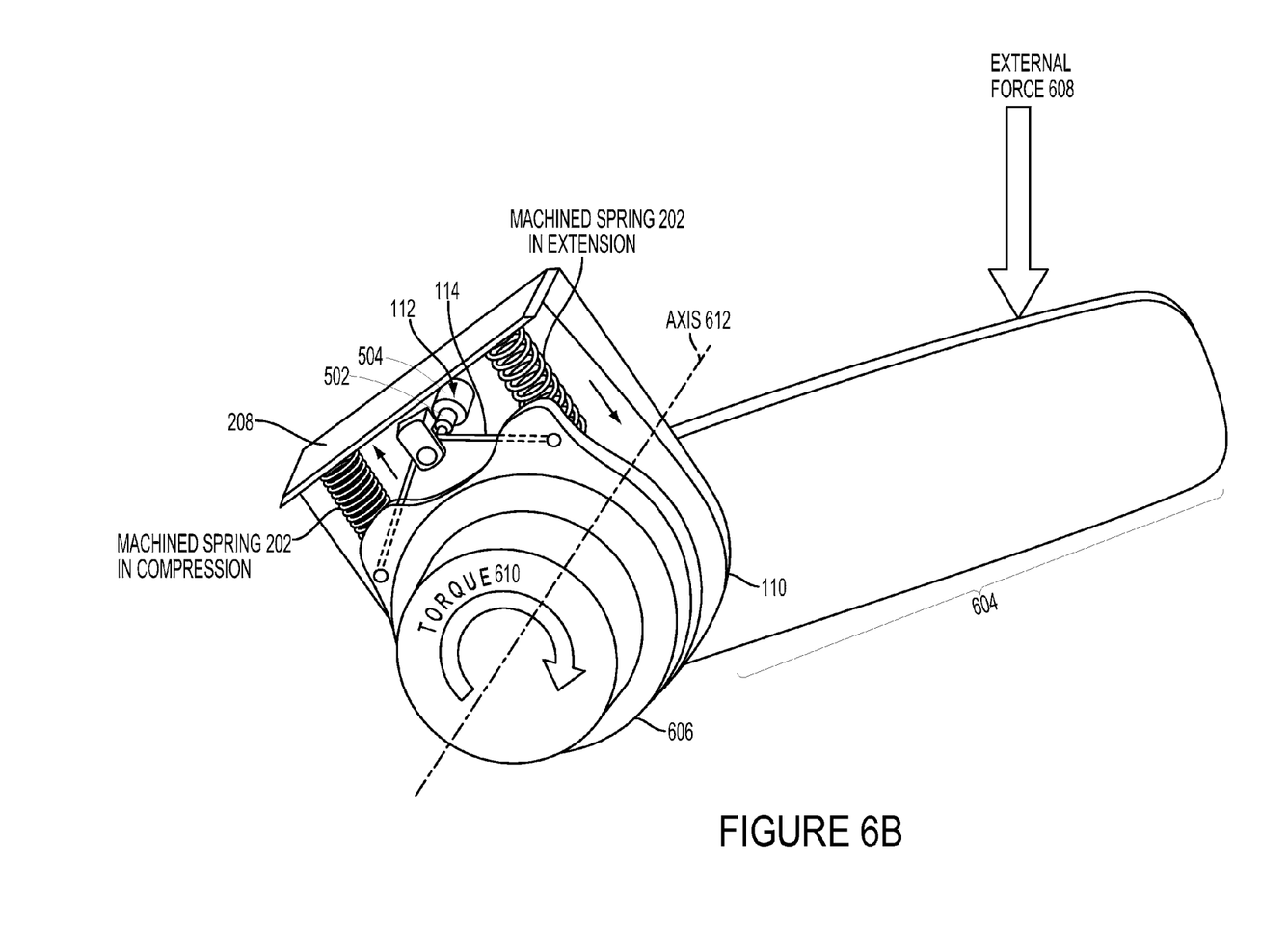
FIG. 6B illustrates a close up view of the rotary SEA implementation presented in FIG. 6A, according to an example embodiment.

FIG. 6B shows a close up view of the rotary SEA 100 implementation presented in FIG. 6A. In particular, FIG. 6B shows how an application of the external force 608 may cause rotation of the shaft 502 of the rotary sensor 112 as well as compression and extension of each respective spring 202. As mentioned above, the external force 608 may cause an application of a torque 610 to the motor housing assembly 606. Consequently, the torque 610 may cause a clockwise rotation of the motor housing assembly 606 about axis 612 as illustrated by FIG. 6B. Note that, while not shown in FIG. 6B, the housing 110 may be connected to the robotic arm link 602.

As illustrated by the arrows, the clockwise rotation of the motor housing assembly 606 may cause a compression of one of the springs 202 and an extension of the other spring 202. The respective compression and extension may be proportional to the torque 610 caused by the external force 608. Additionally, the rotation of the motor housing assembly 606 may be damped by the springs 202 such that the system returns to equilibrium as quickly as possible without significant oscillations (or without any oscillations at all). In other words, when the external force 608 is removed, the system may return to an equilibrium state such that neither spring 202 is at extension or compression and thereby a minimal load (or no load) is then experienced by the rotary bearing(s) 108.

Further, the rotation of the motor housing assembly 606 may cause a rotation of the shaft 502 of the rotary sensor 112. As mentioned above, the rotary sensor 112 may determine information related to the rotary deflection of the motor housing assembly 606. The information may then be sent to a controller and/or an on-board computer configured to adjust the operation of the robotic system and/or the rotary SEA 100 based on the information. More specifically, the information may include: a measurement of the rotary deflection of the motor housing assembly 606, a measurement of the linear deflection of the springs 202, a measurement of the torque 610 applied to the motor housing assembly 606, and/or a measurement of the external force 608 applied to the robotic arm link 604, among other possibilities.

Figure 6C:
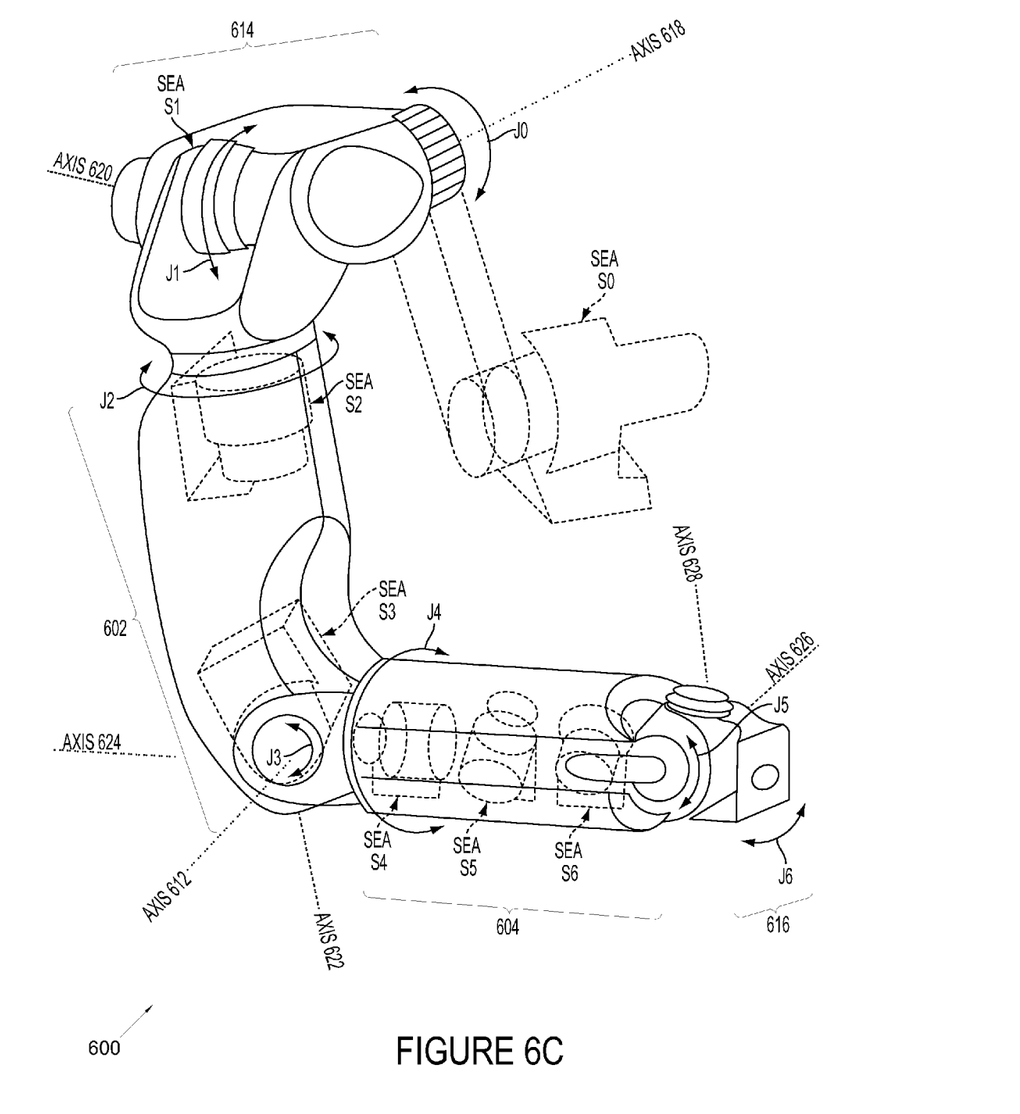
FIG. 6C illustrates additional possible implementations of the rotary SEA in the robotic arm, according to an example embodiment.

FIG. 6C illustrates additional possible implementations of the rotary SEA 100 in the robotic arm 600. More specifically, a rotary SEA may be positioned at each joint of the robotic arm 600 to allow for movements of the robotic arm 600 at seven degrees of freedom. Additionally, the rotary SEAs may enable sensing of externally applied forces at each joint of the robotic arm 600, thereby improving force control. For instance, FIG. 6C shows seven joints J0-J6 accompanied by arrows that may illustrate the movement of various parts of the robotic arm 600 caused by actuation at the respective joint.

In one example, SEA S0 (e.g., positioned inside a chest of a humanoid robot) may be configured to apply a rotational force at joint J0 and, as a result, may cause a rotation of robotic arm link 614 about axis 618. Such a rotation of robotic arm link 614 may result in a collective movement of the entire robotic arm 600. Additionally, an external force applied on the robotic arm 600 may result in a torque applied at the joint J0 that can be sensed by a sensor on the rotary SEA S0.

In another example, SEA S1 may be configured to apply a rotational force at joint J1 and, as a result, may cause a rotation of robotic arm link 602 about axis 620. Such a rotation of robotic arm link 602 may also result in a movement of robotic arm links 604 and 616. Additionally, an external force applied on the robotic arm 600 may result in a torque applied at the joint J1 that can be sensed by a sensor on the rotary SEA S1.

In yet another example, SEA S2 may be configured to apply a rotational force at joint J2 and, as a result, may cause a rotation of robotic arm link 602 about axis 622. Such a rotation of robotic arm link 602 may also result in a movement of robotic arm links 604 and 616. Additionally, an external force applied on the robotic arm 600 may result in a torque applied at the joint J2 that can be sensed by a sensor on the rotary SEA S2.

In yet another example, SEA S3 may be configured to apply a rotational force at joint J3 (e.g., as discussed above in association with FIGS. 6A-C) and, as a result, may cause a rotation of robotic arm link 604 about axis 612. Such a rotation of robotic arm link 604 may also result in a movement of robotic arm link 616. Additionally, an external force applied on the robotic arm 600 may result in a torque applied at the joint J3 that can be sensed by a sensor on the rotary SEA S3.

In yet another example, SEA S4 may be configured to apply a rotational force at joint J4 and, as a result, may cause a rotation of robotic arm link 604 about axis 624. Such a rotation of robotic arm link 604 may also result in a movement of robotic arm link 616. Additionally, an external force applied on the robotic arm 600 may result in a torque applied at the joint J4 that can be sensed by a sensor on the rotary SEA S4.

In yet another example, SEA S5 may be configured to apply a rotational force at joint J5 and, as a result, may cause a rotation of robotic arm link 616 about axis 626. Additionally, an external force applied on the robotic arm 600 may result in a torque applied at the joint J5 that can be sensed by a sensor on the rotary SEA S5.

In yet another example, SEA S6 may be configured to apply a rotational force at joint J6 and, as a result, may cause a rotation of robotic arm link 616 about axis 628. Additionally, an external force applied on the robotic arm 600 may result in a torque applied at the joint J6 that can be sensed by a sensor on the rotary SEA S6. Other examples may also be possible and are not limited to a robotic arm.

Figure 7A:
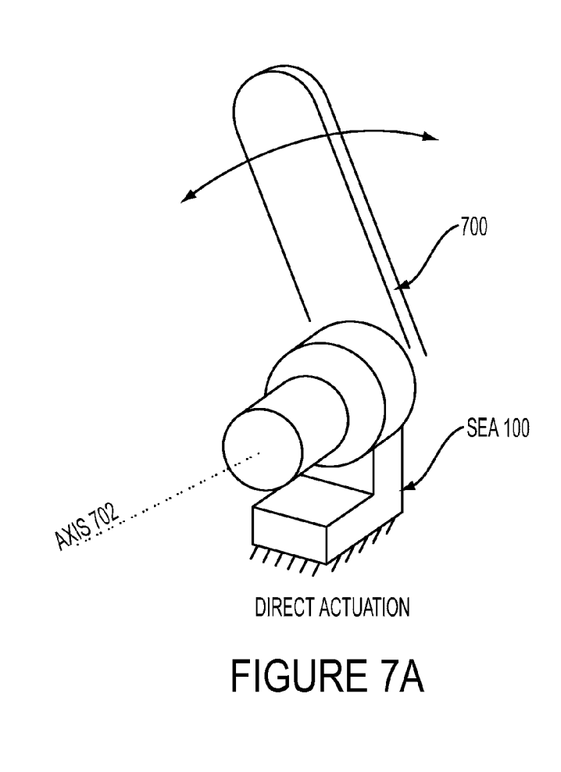
FIG. 7A illustrates a form of direct actuation, according to an example embodiment.
Figure 7B:
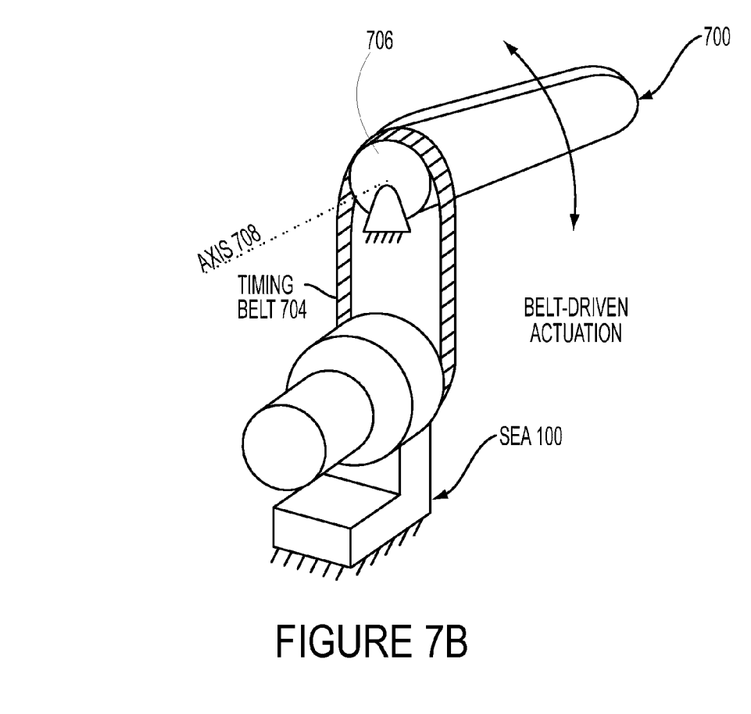
FIG. 7B illustrates a form of belt-driven actuation, according to an example embodiment.
Figure 7C:
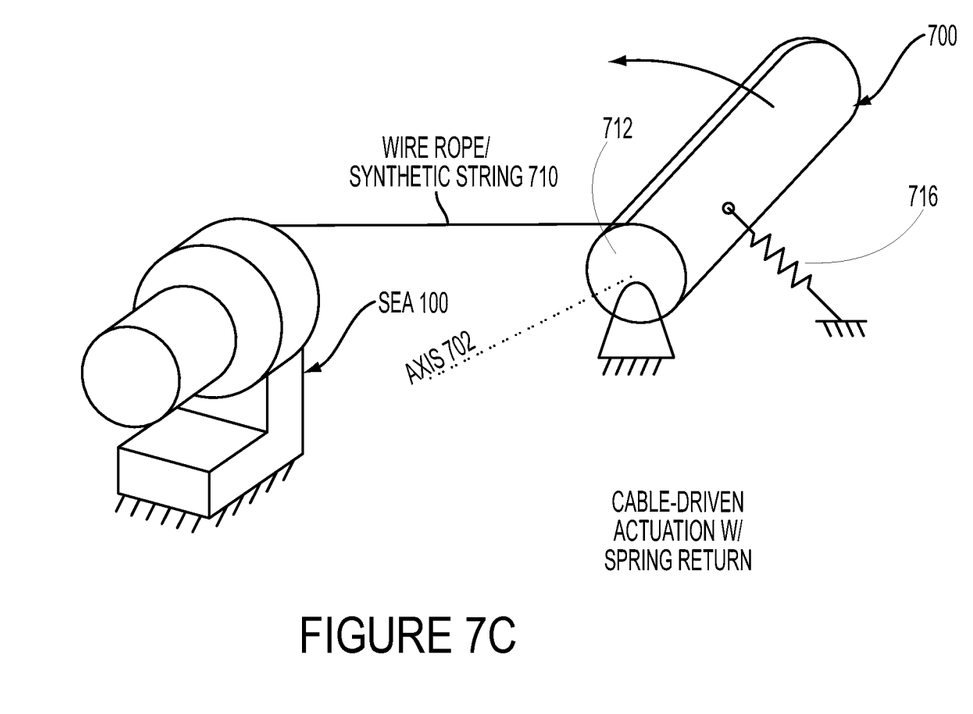
FIG. 7C illustrates a form of cable-driven actuation with a spring return, according to an example embodiment.

FIGS. 7A-7C illustrate example methods of actuation in a robotic system. For example, FIG. 7A shows a form of direct actuation (e.g., as illustrated in FIGS. 6A-6B) where robot link 700 may be directly connected to the output plate 106 of the rotary SEA 100 such that the motor 102 can cause a rotation (i.e., by application of a torque) of the robot link 700 about axis 702. In another example, FIG. 7B shows a form of belt-driven actuation (e.g., as illustrated by SEA S0 in FIG. 6C) where a timing belt 704 may be tightly wrapped around a portion of the output plate 106 and a portion of a rotary mechanism 706. The rotary mechanism 706 may be connected to the robot link 700 such that the motor 102 can cause a rotation of the rotary mechanism 706, via the timing belt 704, thereby causing a rotation of the robot link 700 about axis 708.

In yet another example, FIG. 7C shows a form of cable-driven actuation with a spring return. In particular, a cable 710 (e.g., a wire rope or a synthetic string) may be connected on one end to the output plate 106 and may be connected on the other end to a rotary mechanism 712. The rotary mechanism 712 may be connected to the robot link 700 such that the motor 102 can cause a rotation of the rotary mechanism 712, via the cable 710, thereby causing a rotation of the robot link 700 about axis 714. A spring 716 may be connected on one end to any part of the robot link 700 and on the other end to ground (e.g., robot chassis). The spring 716 may be under extension when the motor 102 causes a rotation of the robot link 700 and the spring 716 may be configured to return the robot link 700 to an initial position after actuation caused by the motor 102 is stopped. Other examples of actuation methods may also be possible.

III. Conclusion

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

We claim:

1. A system comprising:
    a transmission assembly rotatably connected to a motor, wherein the motor and the transmission assembly are supported on an inner race of one or more rotary bearings;
    a housing connected to a chassis and configured to support an outer race of the one or more rotary bearings;
    one or more springs each having a first end attached to a bottom plate of the housing and a second end connected to the transmission assembly such that friction is reduced between (i) balls in the one or more rotary bearings and (ii) the inner and outer races of the one or more rotary bearings;
    a rotary sensor positioned on the housing and configured to measure a rotary deflection of the transmission assembly, wherein the rotary sensor comprises a rotary shaft; and
    a string wrapped around the rotary shaft, wherein ends of the string are attached to the transmission assembly such that a rotation of the transmission assembly causes a rotation of the rotary shaft.

2. The system of claim 1, wherein the rotation of the transmission assembly causes a linear deflection of the one or more springs during application of a load to the transmission assembly.

3. The system of claim 2, wherein the rotary sensor is configured to convert a measurement of the rotary deflection of the transmission assembly to a measurement of the linear deflection of the one or more springs.

4. The system of claim 1, wherein the rotary sensor is configured to measure the rotary deflection of the transmission assembly relative to the chassis.

5. The system of claim 1, wherein the rotary sensor comprises a hall effect encoder.

6. The system of claim 1, wherein the string comprises a steel cable, and wherein the system further comprises:
    a winding element configured to adjust a tension of the steel cable.

7. The system of claim 6, wherein the winding element comprises a spindle and a locking screw, wherein a rotation of the spindle causes an adjustment of the tension, and wherein the locking screw is configured to maintain the adjustment of the tension.

8. The system of claim 1, further comprising:
    a tunable nut configured to adjust the friction between (i) the balls in the one or more rotary bearings and (ii) the inner and outer races of the one or more rotary bearings.

9. The system of claim 1, wherein the transmission assembly comprises a harmonic drive.

10. A system comprising:
    a transmission assembly rotatably connected to a motor, wherein the motor and the transmission assembly are supported on an inner race of one or more rotary bearings, and wherein the transmission assembly comprises an output plate connected to a first robot link;
    a housing connected to a second robot link and configured to support an outer race of the one or more rotary bearings;
    one or more springs each having a first end attached to a portion of the housing and a second end connected to the transmission assembly such that friction is reduced between (i) rolling elements in the one or more rotary bearings and (ii) the inner and outer races of the one or more rotary bearings;
    a rotary sensor positioned on the housing and configured to measure a rotary deflection of the transmission assembly, wherein the rotary sensor comprises a rotary shaft; and
    a string wrapped around the rotary shaft, wherein ends of the string are attached to the transmission assembly such that a rotation of the transmission assembly causes a rotation of the rotary shaft.

11. The system of claim 10, further comprising:
    a tunable nut configured to adjust the friction between (i) the rolling elements in the one or more rotary bearings and (ii) the inner and outer races of the one or more rotary bearings.

12. The system of claim 10, wherein an external force applied to the first robot link causes the rotation of the transmission assembly.

13. The system of claim 10, wherein the motor is configured to cause a rotation of the first robot link by application of a torque to the transmission assembly.

14. The system of claim 10, wherein the portion comprises a plate configured for coupling to the second robot link.

15. The system of claim 10, wherein the output plate rotates differentially to a casing of the transmission assembly.

16. A system comprising:
- a transmission assembly rotatably connected to a motor, wherein the motor and the transmission assembly are supported on an inner race of one or more rotary bearings;
- a housing connected to a chassis and configured to support an outer race of the one or more rotary bearings;
- first and second springs each having a first end attached to a portion of the housing and a second end connected to the transmission assembly such that friction is reduced between (i) balls in the one or more rotary bearings and (ii) the inner and outer races of the one or more rotary bearings;
- a rotary sensor positioned on the housing and configured to measure a rotary deflection of the transmission assembly, wherein the rotary sensor comprises a rotary shaft; and
- a string wrapped around the rotary shaft, wherein ends of the string are attached to the transmission assembly such that a rotation of the transmission assembly causes a rotation of the rotary shaft, wherein the rotation of the transmission assembly further causes an extension of the first spring and a compression of the second spring.

17. The system of claim 16, wherein the rotary sensor is configured to convert a measurement of the rotary deflection of the transmission assembly to a measurement of a linear deflection of the first and second springs.

18. The system of claim 17, further comprising:
- a winding element configured to adjust a tension of the string.

19. The system of claim 16, wherein the transmission assembly comprises an output plate configured to support a robot link.

20. The system of claim 19, wherein an external force applied to the robot link causes the rotation of the transmission assembly.

* * * * *